US009167331B2

(12) United States Patent
Haynes (10) Patent No.: US 9,167,331 B2
(45) Date of Patent: Oct. 20, 2015

(54) BENDABLE CORD FOR CONTROLLING AN ELECTRONIC DEVICE

(71) Applicant: Google Inc., Mountain View, CA (US)

(72) Inventor: Thomas E. Haynes, Mountain View, CA (US)

(73) Assignee: Google Inc., Mountain View, CA (US)

( * ) Notice: Subject to any disclaimer, the term of this patent is extended or adjusted under 35 U.S.C. 154(b) by 298 days.

(21) Appl. No.: 13/850,754

(22) Filed: Mar. 26, 2013

(65) Prior Publication Data

US 2014/0294192 A1    Oct. 2, 2014

(51) Int. Cl.
*H04R 1/10* (2006.01)
*G06F 1/16* (2006.01)
*H04M 1/60* (2006.01)

(52) U.S. Cl.
CPC .............. *H04R 1/1041* (2013.01); *G06F 1/163* (2013.01); *H04M 1/6058* (2013.01)

(58) Field of Classification Search
CPC ............. H04R 5/033; H04G 3/04; H04G 1/02
USPC ............................................ 381/74, 105, 109
See application file for complete search history.

(56) References Cited

U.S. PATENT DOCUMENTS

| 7,256,347 | B2 | | 8/2007 | Gustavsson | |
|---|---|---|---|---|---|
| 8,320,579 | B2 | | 11/2012 | Gustavsson | |
| 2009/0257604 | A1 | * | 10/2009 | Yeates | 381/105 |
| 2011/0170733 | A1 | * | 7/2011 | Aase et al. | 381/384 |
| 2011/0180962 | A1 | * | 7/2011 | Aase et al. | 264/278 |
| 2011/0262086 | A1 | * | 10/2011 | Tatsumi et al. | 385/101 |
| 2011/0316611 | A1 | * | 12/2011 | Gustavsson | 327/516 |

OTHER PUBLICATIONS

Schwarz et al.,"Cord Input: An Intuitive, High-Accuracy, Multi-Degree-of-Freedom Input Method for Mobile Devices", Human-Computer Interation Institute, Carnegie Mellon, Apr. 10-15, 2010.

* cited by examiner

*Primary Examiner* — Simon King
(74) *Attorney, Agent, or Firm* — Morris & Kamlay LLP (57) ABSTRACT

Described is a technique for controlling an electronic device by manipulating a headphone cord. This may be accomplished by sensing various bends and/or bend patterns to the cord. The cord may include a resistive member such as a rod or hollow member for providing tactile feedback to a user. The resistive member may provide a bending resistance or a collapse that provides a tactile sense of when the bend produces an effect for controlling the electronic device. A degree of bend may be determined by the sensors and a controller may provide a control input to the electronic device based on the determined bend. In one instance, the volume of the electronic device may be decreased based on the degree of bend.

23 Claims, 6 Drawing Sheets

FIG. 5

BENDABLE CORD FOR CONTROLLING AN ELECTRONIC DEVICE

BACKGROUND

When using headphones with a portable electronic device, a user may find it cumbersome to control the device in certain situations. For instance, controls for the portable electronic device may not be accessible when, for example, the device is located within a user's pocket. To improve the accessibility of controls, some headphones include in-line media controls. Accessing these controls, however, often requires the user to find and manipulate buttons, knobs, or dials, which may be inconvenient and not necessarily intuitive. Moreover, these controls are often located on an additional component which may have a different form factor than the headphone cord. Accordingly, these, often bulky, components may not conform to the overall aesthetics of the headphone design.

BRIEF SUMMARY

Described is a system and technique for controlling an electronic device by bending a cord of a headphone device. In an implementation, the cord may be configured to connect a headset to an electronic device and to provide input for controlling the electronic device. The cord may include a resistive member configured to provide a tactile bending resistance and may also include a sensor configured to determine a bend of the resistive member. A signaling component may be configured to provide a signal to the electronic device based on the determined bend. The signaling component may be a controller and the signal may be a control input. The determined bend may include a degree of bend, a bend pattern, or a type of bend. The resistive member may be resilient, biased, collapsible, and may be distinct from an outer cord material and audio wires of the cord. The control input may include a gradual volume adjustment any may also include a mute or partial-mute command. In some instances, the controller may provide a second control input when the determined degree of bend is beyond a second bending threshold and the resistive member may collapse at the second bending threshold.

In an implementation, the cord may include a first resistive member configured to provide tactile bending resistance and the first restive member may be within a first input region. A first sensor may be configured to determine a bend of the first input region and a controller may be configured to provide a control input to the electronic device based on the determined bend. In some instances, the cord may also include a second sensor configured to determine a manipulation of a second input region and the control may further determine a control input based on the determined manipulation. The manipulation of the second input region may include a non-bending type manipulation and may activate the first sensor.

In an implementation, described is a method of providing input for controlling an electronic device from a cord. The cord may connect a headset to the electronic device. The method may include determining, by a sensor of the cord, a bend of a resistive member of the cord. The method may also include providing a control input to the electronic device based on the determined bend. The determined bend may include a degree of bend and the degree of bend may include a degree of bend beyond a first bending threshold. The first bending threshold may include an initial bend and the resistive member may be configured to provide a tactile bending resistance. The control input to the electronic device may include an answer call, hang-up call, mute, partial mute, play, pause, stop, next, previous, and other commands.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Described is a system and technique for intuitively controlling a portable electronic device by manipulating a cord of a headphone device. This may be accomplished without bulky control components, and thus, provides the ability to maintain a sleek and minimal headphone design. Controlling the device may be accomplished by including components within a cord of a headphone that may sense various forms of cord manipulation. In one example, the manipulation may include a bending of the cord. The cord may include a resistive member such as a stiffening rod or hollow member for providing tactile feedback to a user. For example, the resistive member may provide resistance to a bending manipulation that provides a tactile sense of when the bend begins to produce an effect for controlling the electronic device. A degree of bend may be determined by one or more sensors within the cord and a controller may provide a control input to the electronic device based on the determined bend. For example, if the electronic device is an audio player, the control input may include an adjustment to the volume of the device or other inputs such as playing, pausing, or stopping a current track. In another example, the degree of bend beyond a threshold may provide a gradual volume control including muting the device if the degree of bend is beyond another threshold or at a maximum bending point. In another example, a bending pattern such as a pattern of multiple bends and/or holds may provide a control input. In yet another example, the resistive member may provide a tactile collapse of the cord and a particular bending pattern including collapses may provide a control input.

Figure 1:
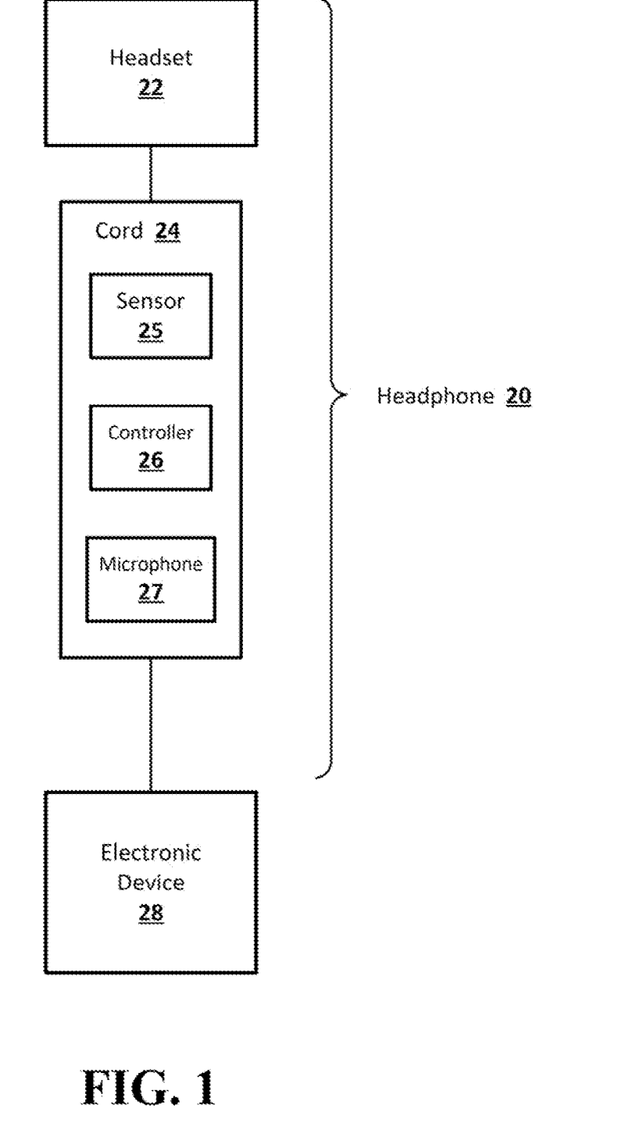
FIG. 1 shows a simplified functional block diagram of a representative device according to an implementation of the disclosed subject matter.

FIG. 1 shows a simplified functional block diagram of a representative device according to an implementation of the disclosed subject matter. A cord 24 may connect a headset 22 to an electronic device 28. Together, the cord 24 and headset 22 comprise a headphone 20. The cord 24 may provide a control input for controlling the electronic device 28 and may include a sensor 25, controller 26, and microphone 27. These components may be independently powered by a battery (not shown), microphone bias power, and/or recover power from an attached electronic device 28.

The sensor 25 may include one or more sensors such as resistive or capacitive type sensors that may be embedded along the length or a portion of the cord 24. The sensor 25 may also include a voltage generating sensor, which may be flexible, such as a piezoelectric sensor. Such a sensor may determine a deformation of a sensor material based on a bending and convert the pressure into an electrical signal. The type of sensor may include a sensor capable of sensing heat, light, motion as well as active acoustic refractions, air pressure, or other physical stimulus. A signaling component may recognize and/or measure a particular signal from the sensor 25 and may determine and/or provide a signal such as a control input for controlling the electronic device 28. The signaling component may be included or be part of the sensor 25.

Alternatively, the signaling component may include a controller 26 for providing a control input. The control input may provide one or more commands for controlling the electronic device 28. A control input may include any form of command that an electronic device 28 is capable of interpreting. For example, if the electronic device 28 is a smartphone, the control input may include calling commands such as answer call, hang-up call, as well a media player commands such as play, pause, stop, next track, previous track, skip, menu, fast forward, rewind, mute, volume control, and other general device commands such as power-on, power-off, sleep, and the like. The controller 26 may be embedded within the cord 24 or may be placed at a convenient location such as within a split/yoke, input jack, or other portion of the headphone 20.

The microphone 27 may include any suitable type of microphone and may be placed at a convenient location to receive audio input. The headset 22 may include a single ear piece or individual ear pieces for each ear. The one or more ear pieces may include an in-ear type configuration such as an ear bud or may include an over-the-ear configuration.

The electronic device 28 may include or be part of a variety of types of devices such as a portable media player, mobile phone (including a "smartphone"), handheld device, tablet computer, netbook, laptop, desktop, personal digital assistant ("PDA"), and/or watch, among others. Other components may be part of or connected to the headphone 20, and conversely, all of the components shown in FIG. 1 need not be present.

Figure 2:
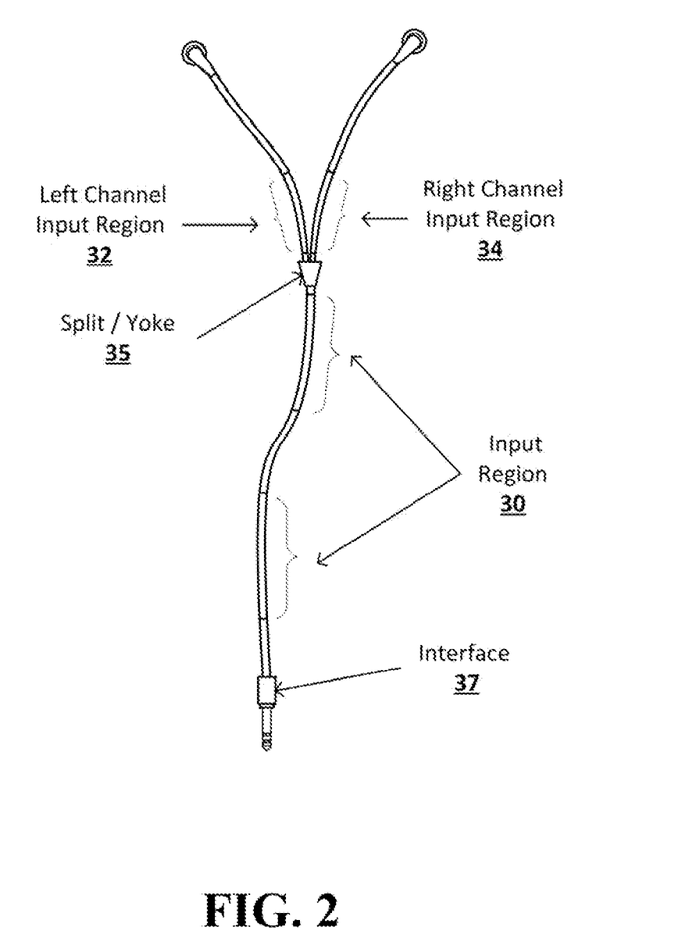
FIG. 2 shows a simplified headphone with left and right earpieces according to an implementation of the disclosed subject matter.

FIG. 2 shows a simplified headphone 20 with left and right earpieces according to an implementation of the disclosed subject matter. The cord 24 may include one or more input regions 30. An input region 30 may include a portion of the cord 24 that may be manipulated to produce a control input. The cord 24 may have a distinct characteristic to identify an input region 30. For example, the cord 24 may include a visual indicator such as a marking, color, or other characteristic for identifying an input region 30. The cord 24 may also include a form of illumination such as utilizing phosphors or light emitting diodes (LED) on the cord 24 to provide a visual indicator especially in low-light conditions. The cord 24 may also include a distinct tactile indicator to enable a user to locate the input region 30 without having to visually identify the location. This may include the cord 24 having a particular texture or friction characteristic. For example, the cord 24 may include ribbing or another tactile texture to indicate an input region 30. The input region 30 may also be identified based on a distinct bending characteristic of a portion of the cord 24. For example, a portion of the cord 24 may include a flexible resistive member to provide tactile feedback such as a tactile bending stiffness that is perceptible by a user. In addition, the resistive members may prevent inadvertent bending that may be interpreted as control inputs during use of the headphone 20.

Input regions for a left channel 32 and a right channel 34 of audio may also be included. The cord 24 may split to connect to each earpiece and a user may control a given channel based on an input region located between the split/yoke 35 and each earpiece. An input region between the split/yoke 35 and an interface 37 to the electronic device (e.g. headphone jack), may control both channels/earpieces. For example, as shown in FIG. 2, a cord manipulation to 32 and 34 will control the left channel and right channels respectively, while a manipulation to 30 will control both channels. The cord 24 may include one or more input regions 30 on portions of the cord 24 (as shown in FIG. 2), or the length of the cord 24 may be considered an input region 30. Each of the input regions 30 may be manipulated by the techniques described further herein, and these input regions 30 may work in conjunction to provide a control input. This may include determining control inputs simultaneously from more than one input region 30. In some instances, an input region may activate or inform the controller 26 to recognize a control input from another input region. The manipulation of a second input region may include a non-bending type manipulation. For example, a pinch (e.g. laterally squeezing the cord) manipulation of a second input region may inform and/or active the controller 26 or a sensor 25 to determine a bend of a first input region. Accordingly, cord manipulations from two hands may be utilized for providing control inputs. For example, a "pinch" of one portion of the cord 24 and a "bend" of another portion of the cord 24 may provide a control input. This activation technique may lessen the probability of false control inputs from inadvertent manipulations of the cord 24.

Figure 3A:
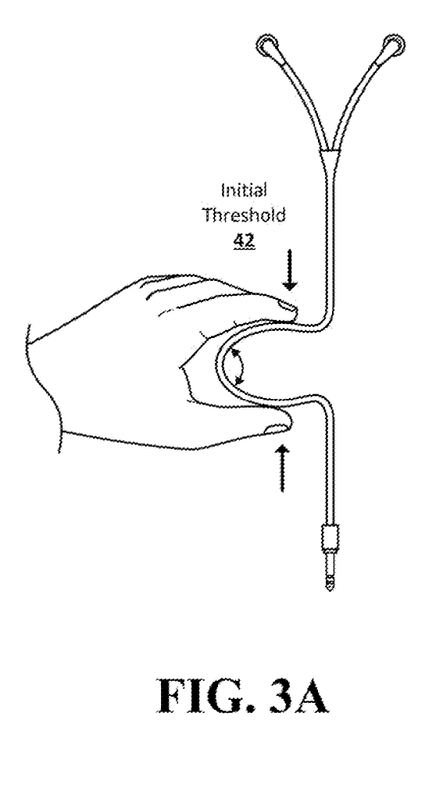
FIG. 3A shows a cord bending to an initial threshold according to an implementation of the disclosed subject matter.
Figure 3B:
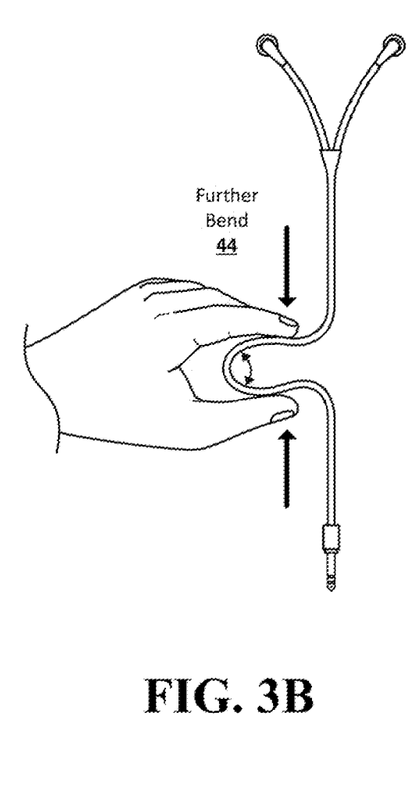
FIG. 3B shows the cord of FIG. 3A bending beyond the initial threshold according to an implementation of the disclosed subject matter.
Figure 3C:
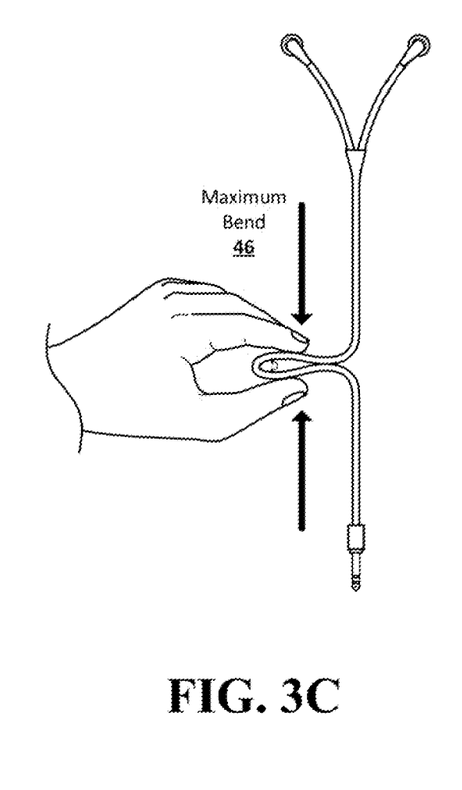
FIG. 3C shows the cord of FIG. 3A bending to a maximum bend according to an implementation of the disclosed subject matter.

FIGS. 3A-3C show an example of bending a cord 24 beyond a threshold to provide a control input according to an implementation of the disclosed subject matter. FIG. 3A shows the cord (e.g. cord 24) bending to an initial threshold 42. The portion of the cord shown as bent may include a resistive member corresponding to an input region 30, or the resistive member may be included throughout the length of the cord 24. This tactile response may include a bending resistance to indicate the bend is within an input region 30. For example, when the cord 24 is bent at or beyond the initial threshold 42, the user may begin to feel an increase in bending resistance. In another example, the resistive member may not provide any additional bending resistance beyond the cord itself until the cord 24 is bent beyond the initial threshold 42. For instance, the outer cord material used for shielding or encapsulating components within the cord may have an inherit bending resistance. The resistive member may not provide a resistance in addition to this inherit bending resistance until the cord 24 is bent beyond the initial threshold 42.

FIG. 3B shows the cord 24 bending beyond the initial threshold of FIG. 3A. A further bend 44 or a bend beyond the initial threshold 42 may provide a control input. The control input may include a binary input, or it may include an input that measures and determines a degree of bend of the cord. Accordingly, the degree of bend may be used to provide a variable or dynamic control input. For example, the control input may include commands to gradually increase or decrease the volume based on the determined degree or amount of bend.

FIG. 3C shows the cord bending to a substantially maximum bend 46. Bending the cord to a substantially maximum bend 46 or beyond a second threshold may provide a control input, which may be in addition to any control inputs provided as described above. For example, when bending the cord to a maximum bend 46 a variable input may be set to a maximum such as completely muting the device. It should be noted that although an initial threshold and a maximum bend are described above, additional thresholds may also be measured to provide additional control inputs. For example, there may be multiple thresholds between an initial threshold and a maximum bend.

In an implementation, the control inputs may relate to a real-world analogy such as bending or crimping a water hose to slow or stop the flow of water. Borrowing aspects of this analogy, the cord 24 may provide a control input for an electronic device 28 that will allow for intuitive and efficient volume control. For example, bending the cord to the initial threshold 42 as shown in FIG. 3A, provides a tactile bending resistance to a user indicating that a further bend 44 may produce an affect. When the cord 24 is bent beyond the initial threshold 42 as shown in FIG. 3B, a degree of bend may be measured and a volume of the electronic device may be gradually decreased accordingly. When the cord is bent to a maximum bend 46 as in shown in FIG. 3C, the control input may mute the device. The mute may also include a partial-mute such as 50% mute, 25% mute, and the like. In addition to controlling the volume gradually or dynamically, any other control inputs may be provided dynamically. For example, the rate at which a track may forward or reverse may increase or decrease based on the determined degree of bend.

The resistive member may be resilient providing the ability for the cord 24 to return to an initial position upon the removal of a bending force. For example, after a user bends the cord 24, the cord 24 it may revert back to an initial position when the user releases or removes the bending force. In addition, the resistive member may be biased to include an initial or "resting" position. For example, the resistive member may be biased to include a substantially straight position. Accordingly, the cord 24 may return to a substantially straight position when the user releases or ceases a bending manipulation. In other implementations, a resistive member may be non-resilient, and accordingly, may have a certain degree of malleability and may hold a bent position. In such a case, a user manipulation of returning the cord 24 to a biased position (e.g. straight position) may also provide a control input. For example, bending the cord 24 may reduce the volume and the cord 24 may remain in a bent form, but when the user bends the cord 24 back to a straight form, the volume may be increased.

Figure 4A:
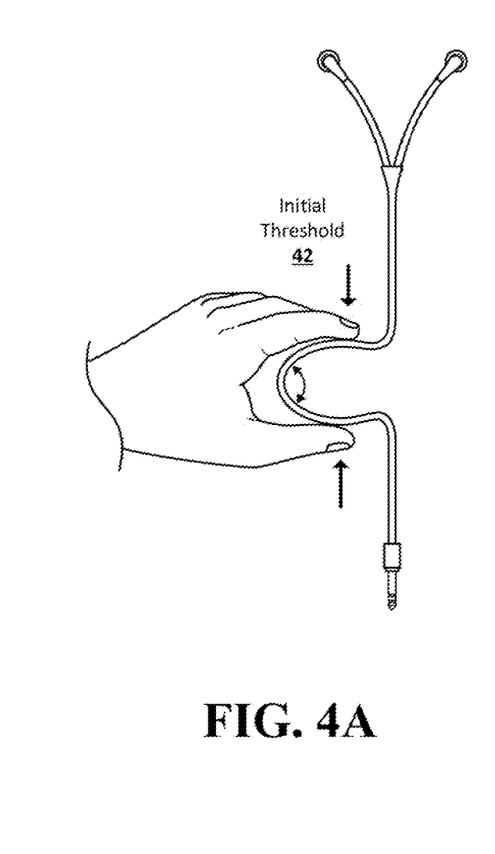
FIG. 4A shows a collapsible cord bending to an initial threshold according to an implementation of the disclosed subject matter.
Figure 4B:
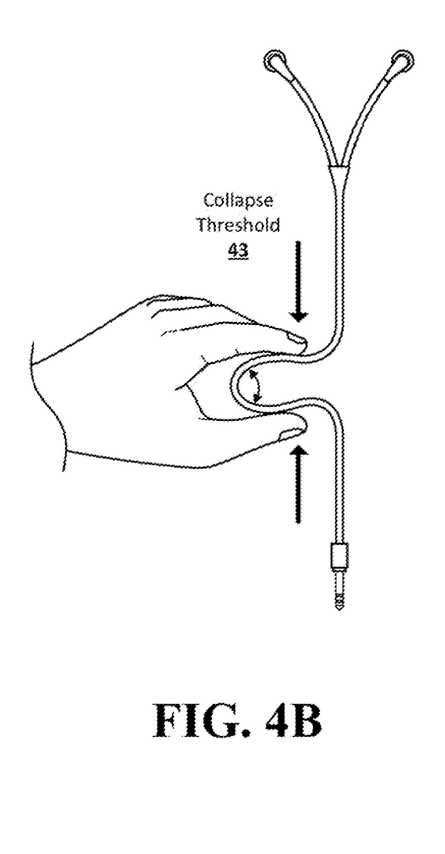
FIG. 4B shows the collapsible cord of FIG. 4A bending to a collapse threshold according to an implementation of the disclosed subject matter.
Figure 4C:
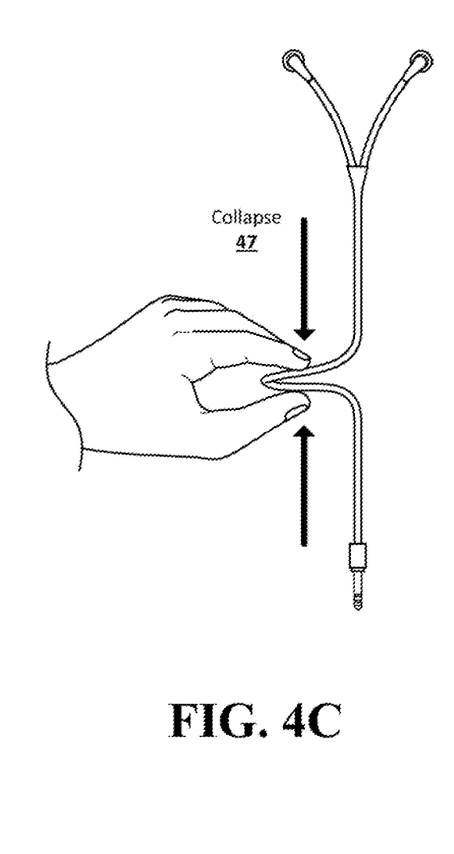
FIG. 4C shows the collapsible cord of FIG. 4A collapsing according to an implementation of the disclosed subject matter.

FIGS. 4A-4C shows an example of collapsing a cord 24 to provide a control input according to an implementation of the disclosed subject matter. FIG. 4A shows the cord 24 bending to an initial threshold 42 as described with respect to FIG. 3A. When the cord 24 is bent beyond the initial threshold 42 a control input may be measured. FIG. 4B shows the cord bent to a collapse threshold 43. The collapse threshold 43 may provide a tactile resistance to the user as described in FIG. 3. FIG. 4C shows a collapse 47 of the cord when the cord 24 is bent beyond the collapse threshold 43. As shown, the cord 24 may collapse by losing a certain degree of rigidity which provides a tactile response to the user. This collapse 47 may provide an additional type of control input.

Figure 5:
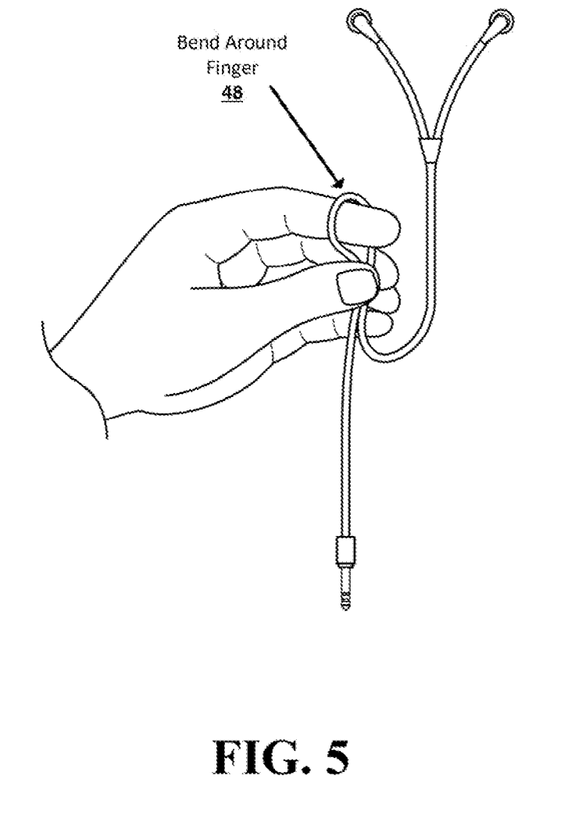
FIG. 5 shows an example of bending a cord around a finger to provide a control input according to an implementation of the disclosed subject matter.

FIG. 5 shows an example of bending a cord 24 around a finger to provide a control input according to an implementation of the disclosed subject matter. In addition to the characteristics described above, a type of bend may also be recognized for determining a control input. The type of bend may include bending the cord 24 around a finger 48 as shown. This may provide a more convenient method of bending the cord 24 in certain situations. For example, if the user has only one hand accessible, this bending method may be more convenient. This type of bend may also have different characteristics than other bends that may be inadvertent. For example, a bend from a user sitting on the cord would likely have different characteristics then a deliberate bend around a finger 48 of the user. Although a substantially inward bend (e.g. a bend towards the palm of the hand) is shown in FIG. 5, an outward bend (e.g. a bend away from the palm of the hand) or a lateral bend may also be recognized.

In addition to the bend manipulations described above, multiple bends or bend patterns may provide a control input. The number of successive bends and the amount of time between bends may be measured for determining a control input. For example, two successive quick bends may provide a control input. A sustained bend for a predetermined amount of time may also provide a control input. For example, a bend and hold may provide a control input. In addition, any combinations of the manipulation described herein may provide a control input. Although these additional manipulations have been described with reference to bends, they may also apply to a collapse manipulation described above. For example, successive collapses, holds, or combinations thereof may provide a control input.

As described herein, a bend may include a fold, pinch, wrap and like type manipulation. Although the techniques described herein relate to a bending of the cord, other forms of cord manipulations may also apply. These other techniques may include determining and/or measuring manipulations such as a lopping or wrapping the cord 24 (e.g. over a finger of a user), a twist, pinch, grasp, straighten, and other cord manipulations that may be recognized for a control input.

Figure 6:
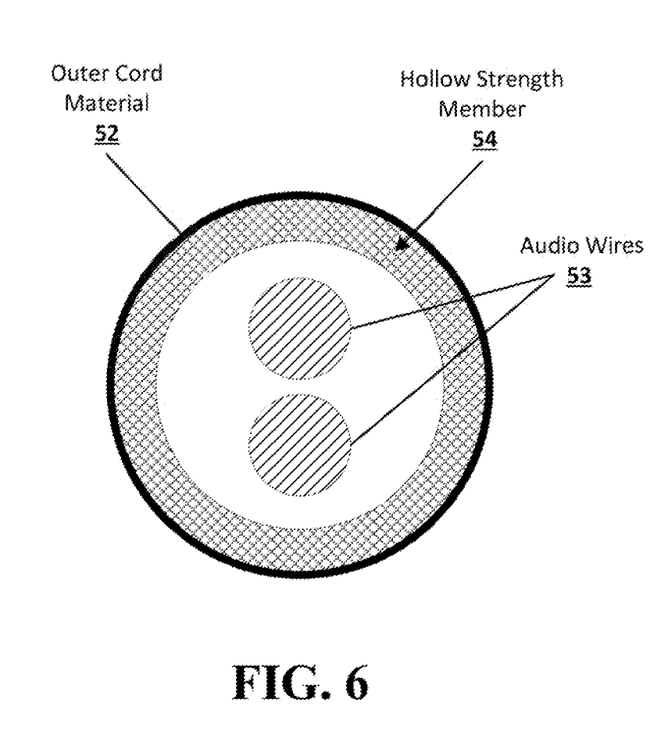
FIG. 6 shows a longitudinal cross-section view of a cord including a resistive member comprising a hollow strength member according to an implementation of the disclosed subject matter.

FIG. 6 shows a longitudinal cross-section view of a cord 24 including a resistive member comprising a hollow strength member according to an implementation of the disclosed subject matter. As shown, the cord may include an outer cord material 52, audio wires 53, and a hollow strength member 54. In some implementations, the resistive member as described herein may comprise a hollow strength member 54 as shown. The hollow strength member 54 may typically be utilized in implementations that include a collapse of the cord as a control input. The hollow strength member 54 may provide flexible stiffness to the cord 24 including a tactile resistance to a bend. When the hollow strength member 54 is bent beyond pre-configured threshold, the cord may collapse as shown in FIG. 4C. The hollow strength member 54 may include a substantially circular shape as shown, but may also include other shapes such as a rectangular or square shape. The shape of the hollow strength member 54 may provide different bend and/or collapse characteristics. For example, a bending of a circular hollow strength member may provide progressive bending resistance up to a collapse threshold. In another example, a rectangular or square circular hollow strength member may provide a substantially constant bending resistance up to a collapse threshold. The cord may include an outer cord material 52 for insulating components within the cord. The outer cord material 52 may comprise any suitable material. In an implementation, the sensors and/or the resistive member may be part of or included in the outer cord material 52. The cord may include audio wires 52 such as an audio line, which may include right and left audio channels, a microphone line, power line, or any other transmission lines. Although two audio wires are shown, there may be fewer wires or additional wires including a wire bundle.

Figure 7:
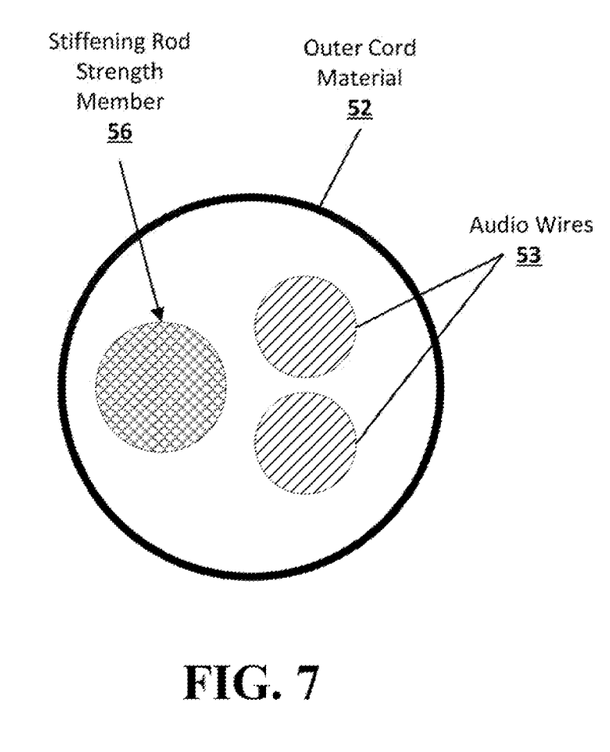
FIG. 7 shows a longitudinal cross-section view of a cord including a resistive member comprising a stiffening rod strength member according to an implementation of the disclosed subject matter.

FIG. 7 shows a longitudinal cross-section view of a cord 24 including a resistive member comprising a rod strength member according to an implementation of the disclosed subject matter. In other implementations, the resistive member as described herein may comprise a stiffening rod strength member 56. The stiffening rod strength member 56 may provide a flexible stiffness to the cord 24 including a tactile resistance to a bend. The stiffening rod strength member 56 and hollow strength member 54 may comprise of any suitable flexible or bendable material for providing a tactile resistance to a bend including plastic, metallic, rubberized, or other material, and combinations thereof.

References to "one implementation," "an implementation," "an example implementation," and the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be included in other implementations whether or not explicitly described. The term "substantially" may be used herein in association with a claim recitation and may be interpreted as "as nearly as practicable," "within technical limitations," and the like.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A cord configured to connect a headset to an electronic device and to provide input for controlling the electronic device, comprising:
a resistive member configured to provide a tactile bending resistance;
a sensor configured to determine a bend of the resistive member,
wherein the determined bend includes a degree of bend; and
a signaling component configured to provide a signal to the electronic device based on the determined bend and a bending threshold.

2. The cord of claim 1, wherein the signaling component is a controller and the signal is a control input.

3. The cord of claim 2, wherein the control input includes a gradual volume adjustment.

4. The cord of claim 2, wherein the determined degree of bend includes a degree of bend beyond a first bending threshold and wherein the first bending threshold includes an initial bend.

5. The cord of claim 4, wherein the controller is further configured to provide a second control input when the determined degree of bend is beyond a second bending threshold.

6. The cord of claim 5, wherein the second control input includes at least one of a mute and a partial-mute command.

7. The cord of claim 1, wherein the determined bend includes a bend pattern of the resistive member.

8. The cord of claim 1, wherein the determined bend includes a type of bend of the resistive member and wherein the type of bend includes a bend around a finger.

9. The cord of claim 1, wherein the tactile bending resistance begins at a first bending threshold and wherein the first bending threshold includes an initial bend.

10. The cord of claim 1, wherein the tactile bending resistance includes a resistance in addition to an inherent resistance of the cord.

11. The cord of claim 1, wherein the resistive member is resilient and biased to a substantially straight position.

12. The cord of claim 1, wherein the resistive member is further configured to collapse and the determined bend includes a collapse of the resistive member.

13. The cord of claim 1, wherein the resistive member is distinct from an outer cord material and audio wires of the cord.

14. The cord of claim 1, wherein the resistive member is a hollow member.

15. The cord of claim 2, wherein the control input includes at least one command selected from the group comprising answer call, hang-up call, mute, partial mute, play, pause, stop, next, and previous.

16. A cord configured to connect a headset to an electronic device and to provide input for controlling the electronic device, comprising:
a first resistive member configured to provide tactile bending resistance, the first restive member within a first input region;
a first sensor configured to determine a bend of the first input region,
wherein the determined bend includes a degree of bend; and
a controller configured to provide a control input to the electronic device based on the determined bend and a bending threshold.

17. The cord of claim 16, further comprising a second sensor configured to determine a manipulation of a second input region and wherein the control input is further based on the determined manipulation.

18. The cord of claim 17, wherein the determined manipulation of the second sensor activates the first sensor.

19. The cord of claim 17, wherein the manipulation of the second input region includes a non-bending type manipulation.

20. The cord of claim 19, wherein the non-bending type manipulation includes a pinch.

21. A method of providing input for controlling an electronic device from a cord connecting a headset to the electronic device, comprising:
   determining, by a sensor of the cord, a bend of a resistive member of the cord, the resistive member configured to provide a tactile bending resistance, and the determined bend including a degree of bend; and
   providing a control input to the electronic device based on the determined bend and a bending threshold.

22. The method of claim 21, wherein the determined degree of bend includes a degree of bend beyond a first bending threshold and wherein the first bending threshold includes an initial bend.

23. The method of claim 21, wherein the control input includes at least one command selected from the group comprising answer call, hang-up call, mute, partial mute, play, pause, stop, next, and previous.

* * * * *